United States Patent
Cutbill et al.

(10) Patent No.: US 7,684,394 B1
(45) Date of Patent: Mar. 23, 2010

(54) SYSTEM AND METHOD FOR INCREASING HOST VISIBILITY IN NETWORK ADDRESS TRANSLATION ENVIRONMENTS

(75) Inventors: R. Gary Cutbill, Westford, MA (US); Johnson M. Earls, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 598 days.

(21) Appl. No.: 11/414,877

(22) Filed: May 1, 2006

(51) Int. Cl.
*H04L 12/28* (2006.01)
*G06F 15/16* (2006.01)

(52) U.S. Cl. ...................................... 370/389; 709/200
(58) Field of Classification Search ....................... None
See application file for complete search history.

(56) References Cited

U.S. PATENT DOCUMENTS

| | | | | |
|---|---|---|---|---|
| 6,128,664 A * | 10/2000 | Yanagidate et al. | ......... | 709/228 |
| 6,922,412 B2 * | 7/2005 | Hrastar et al. | ............... | 370/401 |
| 7,188,138 B1 * | 3/2007 | Schneider | ................... | 709/203 |
| 7,290,283 B2 * | 10/2007 | Copeland, III | ............... | 726/25 |
| 7,478,169 B2 * | 1/2009 | Banerjee et al. | ............. | 709/245 |
| 2004/0243710 A1 * | 12/2004 | Mao | .......................... | 709/227 |
| 2005/0021841 A1 * | 1/2005 | Yoshimoto | .................. | 709/238 |
| 2005/0030956 A1 * | 2/2005 | Lord et al. | .................. | 370/401 |
| 2005/0076141 A1 * | 4/2005 | Williams et al. | ............ | 709/245 |
| 2005/0086379 A1 * | 4/2005 | Asami | ........................ | 709/245 |
| 2007/0058792 A1 * | 3/2007 | Chaudhari et al. | ....... | 379/88.17 |

* cited by examiner

*Primary Examiner*—Hong Cho
*Assistant Examiner*—Eunsook Choi
(74) *Attorney, Agent, or Firm*—Sonnenschein Nath & Rosenthal LLP

(57) ABSTRACT

A mechanism for dynamically performing Network Address Translation that allows external devices to contact internal host systems that would otherwise be hidden behind a NAT device is discussed. The dynamic NAT mechanism of the present invention maps internal host system addresses to external network addresses and reconfigures the NAT configuration of the network firewall to account for the new mapping on demand. Domain Name Service (DNS) lookup requests for an authorized internal system serve as a trigger to create a new mapping between the internal host system and the external network address. The new mappings may have a lifecycle controlled by dynamic leases that are created for each new mapping.

16 Claims, 5 Drawing Sheets

SYSTEM AND METHOD FOR INCREASING HOST VISIBILITY IN NETWORK ADDRESS TRANSLATION ENVIRONMENTS

FIELD OF THE INVENTION

The illustrative embodiment of the present invention relates generally to Network Address Translation (NAT) and more particularly to a mechanism for increasing host visibility in a NAT environment.

BACKGROUND

One side effect from the explosive growth of the Internet is that there are insufficient routable addresses to service all of the systems that may want to connect to the Internet. To address this shortage, a technique known as Network Address Translation (NAT) was developed which allows multiple hosts to sit behind a device (a firewall/router) and share one or more Internet-routable addresses. The firewall is usually considered the edge of the network for an organization. The Internet side is considered the 'outside' and is reachable using external addresses. The hosts belonging to the organization (company, school, homeowner, etc.) are on the 'inside' and use internal or local addresses. The local addresses are not typically routable on the Internet, and hosts on the inside of the firewall are, for the most part, hidden from the Internet. For outbound connections to the Internet, NAT converts a local address to an external address which allows a connection to the Internet to be made from a local system. In the usual case, all of the outbound connections share a single address. The firewall maintains state information about open connections so that it can pass reply packets from Internet hosts back to the correct internal host.

One consequence from the use of NAT is that NAT has the effect of limiting the visibility of hosts from the Internet. This prevents external devices from setting up communications with most internal hosts in a network. While this effect is usually considered a good thing from a security standpoint, in that it prevents unwanted communications from unknown external devices, it also limits any desired communication initiated from external devices to internal hosts. To address this lack of visibility, in a simple case, a firewall may be configured to direct all inbound traffic to a single internal system. In a slightly more complicated case, the inbound traffic can also be selectively routed depending on the port number/protocol. For example, one internal host can receive all inbound FTP traffic, and another can receive all inbound TELNET requests. However, for a given external address, it is still the case that only one host can receive inbound traffic for any given protocol. In an environment where access from outside the network to several internal systems using the same protocol is required, NAT is overly restrictive. For example, each employee of a company may want to be able to occasionally use SSH to connect directly to the workstation on their desk. That's not possible if the workstations are behind a NAT box. Similarly, while some NAT devices provide the ability to support multiple external addresses, their behavior is similar to having multiple NAT boxes each with one external address. Each external address/protocol set may connect to a different internal system, but the number of connections is limited to the number of external addresses. Thus, for example, if a company has three external addresses and fifty internal systems then three of the internal systems are reachable and the remaining forty-seven internal systems are externally inaccessible.

BRIEF SUMMARY

The illustrative embodiment of the present invention provides a mechanism for dynamically performing Network Address Translation that allows external devices to contact internal host systems that would otherwise be hidden behind a NAT device. The dynamic NAT maps internal host system addresses to external network addresses and reconfigures the NAT configuration of the network firewall to account for the new mapping on demand. Domain Name Service (DNS) lookup requests for an authorized internal system serve as a trigger to create a new mapping between the internal host system and the external network address. The new mappings may have a lifecycle controlled by dynamic leases that are created for each new mapping, and which coincide with time-to-live (TTL) information provided with the DNS reply.

In one aspect of the present invention a method of dynamically performing NAT includes the step of receiving a Domain Name Service (DNS) lookup request for an internal host inside a firewall from an external device located outside the firewall. The method creates a new mapping of an internal address from a device inside the firewall to an external network address in response to the received DNS lookup request. The method also dynamically reconfigures a NAT device to reflect the new mapping.

In another aspect of the present invention a system for dynamically performing Network Address Translation (NAT) includes a Network Address Translation (NAT) device that provides NAT for a network that has at least one external network address. The system also includes at least one internal host located inside a firewall for the network. Additionally, the system also includes a Dynamic Domain Name Service (DDNS) server for creating a new mapping of an internal host address to an external host for the network. Also, the system includes a DNS proxy that identifies DNS lookup requests for the at least internal host inside the firewall that are received from an external device located outside the firewall. The DNS proxy dynamically reconfigures the NAT device to reflect a new mapping between an address for the internal host and an external address for the network.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
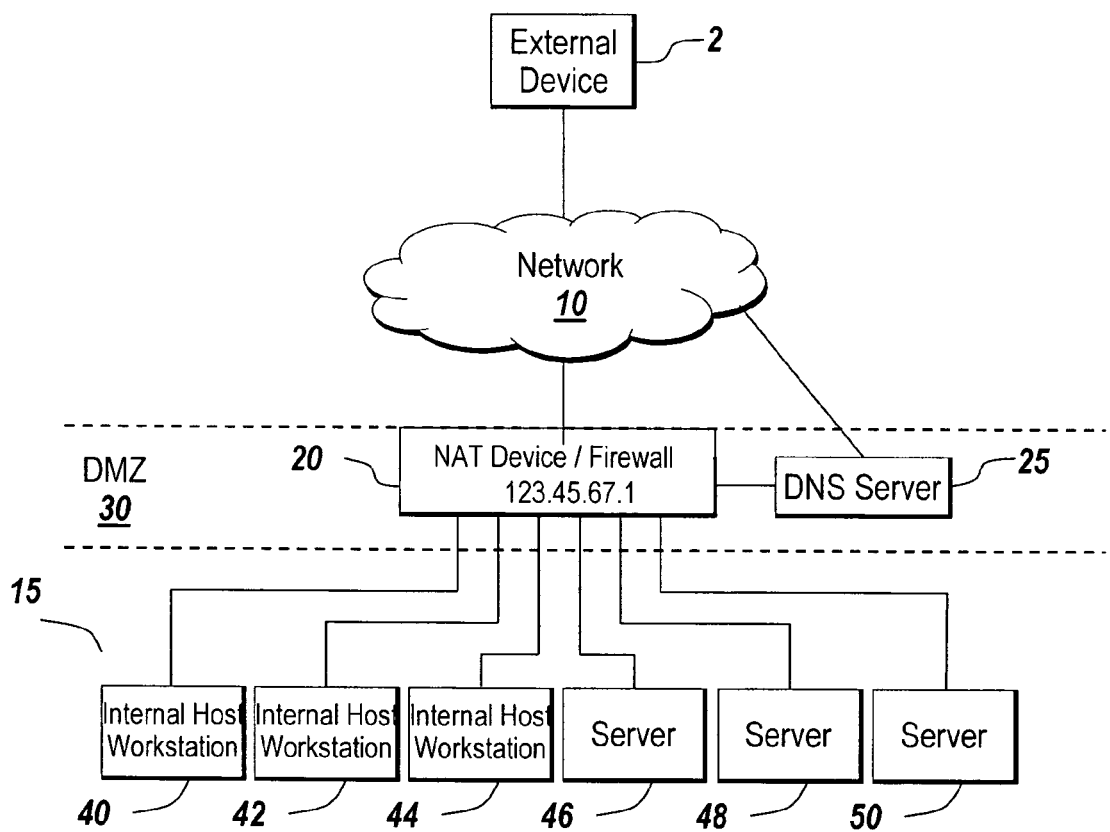
FIG. 1 (prior art) depicts an example of a conventional NAT environment.

The illustrative embodiment of the present invention increases the ability of external devices to communicate with internal host systems in NAT environments. The ability to dynamically update a NAT configuration allows the NAT environment to provide access to an increased number of internal systems without being limited to the number of external addresses for the organization's network. The ability of the dynamic NAT mechanism of the present invention to dynamically reconfigure the NAT device allows the connections to take place without prior knowledge of a user and without requiring drastic changes in the user's expectations of network behavior.

The dynamic NAT mechanism of the present invention provides a number of alterations to traditional NAT environments. In order to better explain the present invention, a conventional NAT environment such as the one depicted in FIG. 1 will first be examined. An external device 2 communicates over the Internet 10 with a LAN 15. The LAN 15 includes a NAT device/firewall 20 and a DNS server 25 that sit in a DMZ 30 which is reachable from the Internet 10. The NAT device/firewall 20 has an external IP address 123.45.67.1. Those skilled in the art will recognize that the local network 15 may have more than one external address. The LAN 15 includes multiple internal host systems including internal host workstations 40, 42 and 44 and servers 46, 48 and 50. The internal host workstations 40, 42 and 44 each have local addresses (10.0.0.1, 10.0.0.2, 10.0.0.3, respectively) as do the servers 46, 48 and 50 (10.0.0.4, 10.0.0.5, 10.0.0.6 respectively). The internal host systems may also have a hostnames such as bob.example.com and steve.example.com. In most NAT environments, the internal host systems 40, 42 and 44 and servers 46, 48 and 50 are not directly routable from the external device 2 communicating over the Internet 10.

In the conventional environment of FIG. 1, the DNS server 25 translates lookup requests for hosts in the local network/domain 15 into actual external IP addresses. For example, requests to access the local network/domain 15, with the name of www.example.com in this example, are translated into the 4 byte external IP address 123.45.67.1 of the NAT device/firewall 20 (those skilled in the art will recognize that for IPV6 format addresses the conversion would be to a 16 byte IP address). The internal host workstations 40, 42, 44 and servers 46, 48 and 50 are not routable by the external network 15 which means that any request to reach an individual host system such as bob.example.com, will either fail or default to another system depending on the implemented NAT rules and the DNS mapping. Common methods of routing requests to the organization's local network include routing all incoming requests to the external IP address to a designated server (such as server 46 in FIG. 1) or filtering the requests based on protocol and sending one type of protocol requests to one internal system and one type of protocol requests to another internal system. For example, all HTTP requests may be routed to server 46 while all FTP requests may be routed to server 48. This conventional NAT environment makes the internal host workstations 40, 42, 44 and server 50 unreachable by specific request from the external device 2. The illustrative embodiment of the present invention addresses this problem.

Figure 2:
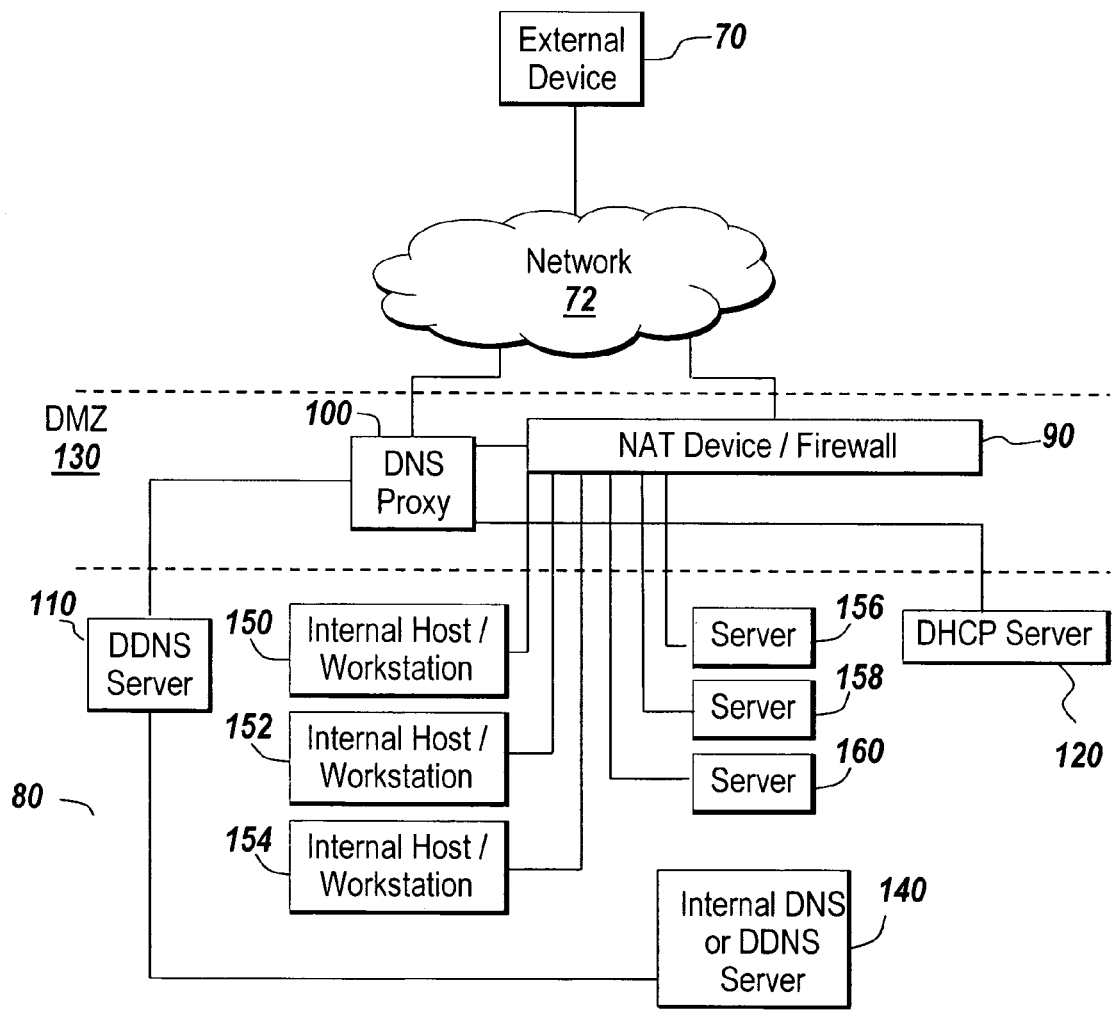
FIG. 2 depicts an environment suitable for practicing the illustrative embodiment of the present invention.

FIG. 2 depicts an environment suitable for practicing the illustrative embodiment of the present invention. An external device 70 attempts to communicate over a network 72 with internal hosts on local network 80. The local network 80 includes a NAT device/firewall 90 and a DNS proxy 100 in a DMZ 130, and a DDNS server 110 and a DHCP server 120 in the DMZ 130 or the local network 80. Behind the firewall, the local network 80 includes internal host/workstations 150, 152 and 154 and servers 156, 158 and 160. An internal DNS (or DDNS) server 140 is also located behind the firewall.

The DNS Proxy 100 receives the initial DNS lookup request from the external device 70, possibly by way of an external DNS server. The DNS Proxy 100 identifies whether the request is directed towards an internal host system for which dynamic NAT is available. For example, internal host/workstation 150 may have the hostname of bob.example.com while internal host/workstation 152 may have the hostname of steve.example.com. The network administrator may have configured the DNS proxy 100 so that bob.example.com will be identified as available for the dynamic NAT of the present invention while steve.example.com is not available for dynamic NAT. The DNS Proxy 100 determines whether the DNS lookup request is related to an eligible internal host and acts accordingly by trying to configure the NAT Device/Firewall 90 to allow connectivity between any host on the network 72 and the internal host if the internal host is available for dynamic NAT or by forwarding the request to the DDNS sever 110 for appropriate handling if the request is related to an ineligible or unrecognized host.

In the event the DNS lookup request is related to an eligible internal host, the DNS proxy requests the internal address from the internal DNS server 140, requests a lease of an external address from the DHCP server 120, configures the NAT device 90 to allow for connectivity between hosts on the network 72 and the internal host, updates the DDNS server 110 with the internal host name and the external address, then replies to the external device 70 with the correct external address. In the event that any of these steps fails, the DNS proxy 100 returns an appropriate error to the external device 70, possibly by way of an external DNS server.

The DNS proxy server 100 may map all of the port numbers for an external address to an internal host. Alternatively, the DNS proxy server may set up the mappings on a protocol by protocol basis. To map on a protocol by protocol basis, the DNS proxy server is created so that it recognizes internal hostnames as "pseudo-domains". These pseudo-domains would then use the actual hostname with the protocol names prepended as if they were hostnames. For example: If somebody wants to connect to an internal system named "bob.example.com" using SSH, they would use a FQDN (fully qualified domain name) of "ssh.bob.example.com". The DNS proxy server would then configure the firewall/NAT device to allow inbound SSH protocol to go to bob.example.com and return the appropriate address to the external host as part of the DNS reply.

The updating of the NAT device 90 may occur via SNMP, HTTP, a command line interface, or other vendor specific protocols In the event that some resource is unavailable, the DNS Proxy returns an appropriate error in response to the original DNS lookup indicating that the hostname is temporarily unavailable. In the event the DNS lookup request is not directed to an eligible internal host system, the DNS proxy passes the request to a regular DNS server for handling. Those skilled in the art will recognize that the functionality described above for the DDNS server 110 and DNS proxy 100 may be combined into a single device or process.

The illustrative embodiment of the present invention may also include a DHCP (Dynamic Host Configuration Protocol) server 120 that keeps track of the dynamically assigned mappings between an internal and external address and creates a lease for each new mapping. The lease length may run for a fixed period of time. Alternatively, the lease may be periodically renewable for a set period of time as long as packets continue to flow between an external device on network 72 and the internal host system that has been mapped to an external address. The lease information may be provided to the NAT device/firewall 90 and the DNS proxy 100 monitors the subsequent flow of packets between the internal host system and the external device 70, or queries the NAT device/firewall 90 to determine whether packet flow exceeds a threshold and the lease should be renewed. Those skilled in the art will recognize that the functionality described above for packet flow monitoring and lease renewal could be embodied in any of several different processes or devices.

The external device 70 and the host internal systems to which the external device attempts to communicate may be PCs, workstations, servers, laptops, mainframes, PDAs or other computing devices equipped with a processor. The network 72 over which the external device 70 attempts to communicate may be the Internet, a local area network (LAN), a wide area network (WAN), a wireless network, an intranet, an extranet or some other type of network.

Figure 3:
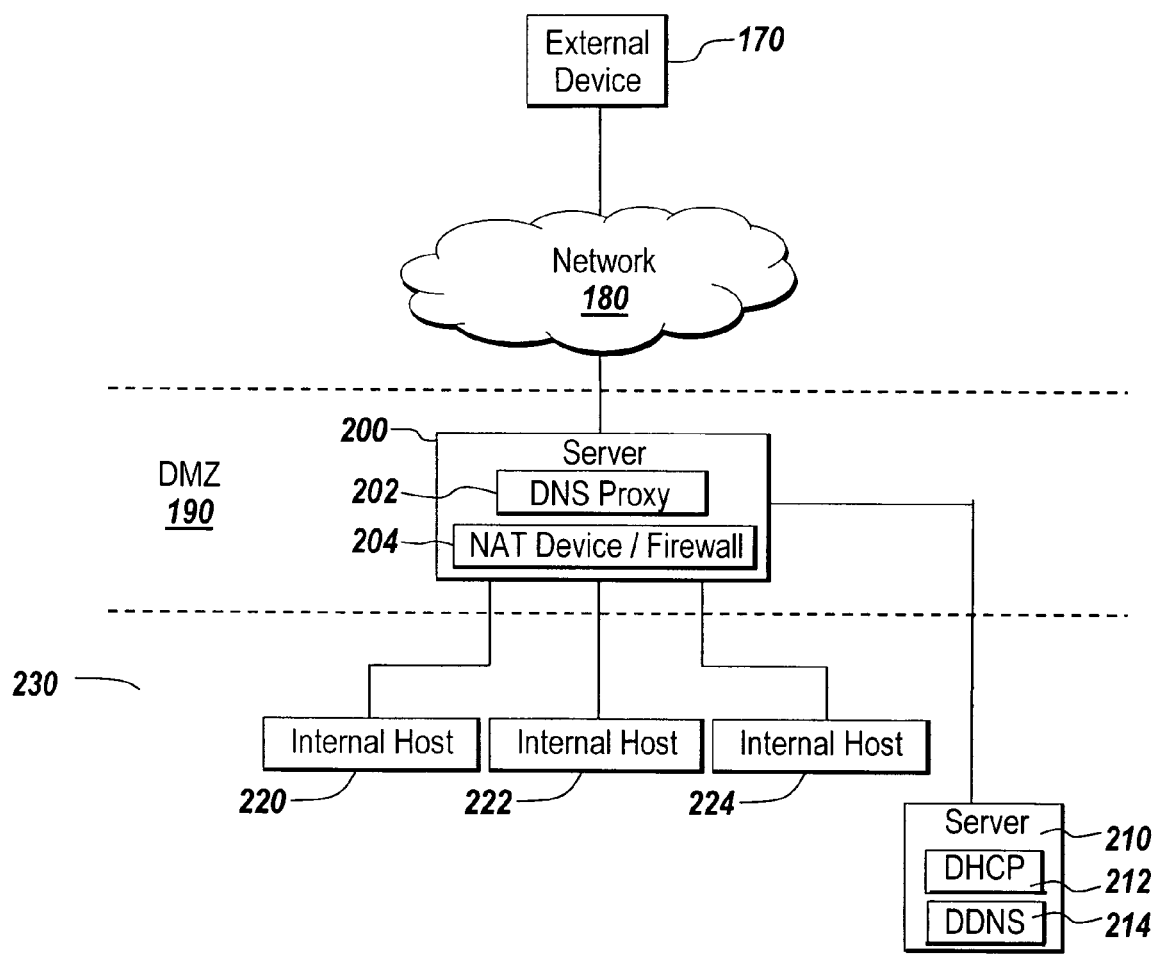
FIG. 3 depicts an alternative environment suitable for practicing the illustrative embodiment of the present invention.

Those skilled in the art will appreciate that other architectures that differ from that depicted in FIG. 2 may also be utilized within the scope of the present invention. For example, FIG. 3 depicts an alternate environment suitable for practicing the illustrative embodiment of the present invention. In FIG. 3, an external device 170 sends a DNS lookup request over a network 180. The DNS lookup request may utilize an external DNS server. The DNS lookup request is directed to an internal host system 220, 222 or 224 in local network 230. The DMZ 190 of the local network 230 includes a server 200 that hosts both a DNS proxy 202 and a NAT device/firewall 204 for the local network. The server 200 is in communication with a second server 210 in the DMZ 190 that hosts a DHCP server 212 and a DDNS server 214. Although arranged in a different configuration, the components perform the dynamic NAT process of the present invention similarly to the manner discussed above for FIG. 2.

Figure 4:
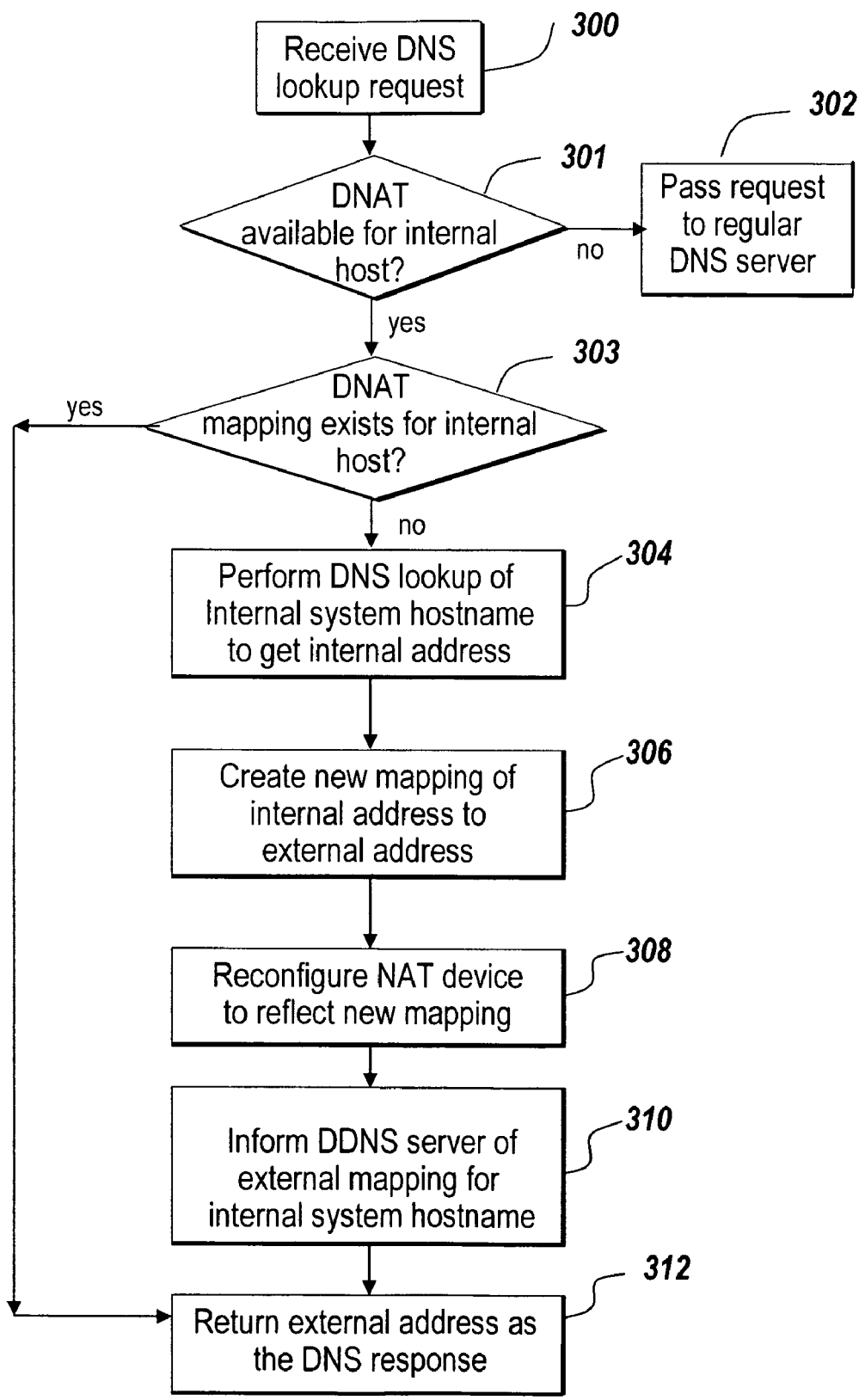
FIG. 4 is a flowchart of the sequence of steps followed by the illustrative embodiment of the present invention to perform dynamic NAT.

The sequence of steps by which the illustrative embodiment of the present invention performs dynamic NAT is illustrated in the flowchart of FIG. 4. The sequence begins with the receipt of a DNS lookup request for an internal host system (step 300). The DNS proxy 100 determines whether the requested internal system is one for which dynamic NAT is available (step 301). If the network administrator has not made the requested internal system available for dynamic NAT, the request is passed to a regular DNS server and handled in a normal manner (step 302). If dynamic NAT is available for the internal host, it is determined whether a dynamic NAT mapping already exists for the internal host (step 303). If the mapping exists, the external address is returned as the DNS response (step 312). If the dynamic NAT mapping for the internal host does not already exist, an internal DNS lookup for the internal host is performed (step 304). The results of the internal DNS lookup are provided to the DNS Proxy server which creates a new mapping between the internal address and the external address (step 306). The DNS proxy reconfigures the NAT device for the local network to reflect the new mapping (step 308) and the DDNS server is informed of the external mapping for internal system hostname (step 310). The response to the lookup request is provided to the external device and future communications from the external device for the internal host system are routed from the external address to the internal address using the new mapping. The external address is then returned as the DNS response (step 312).

Figure 5:
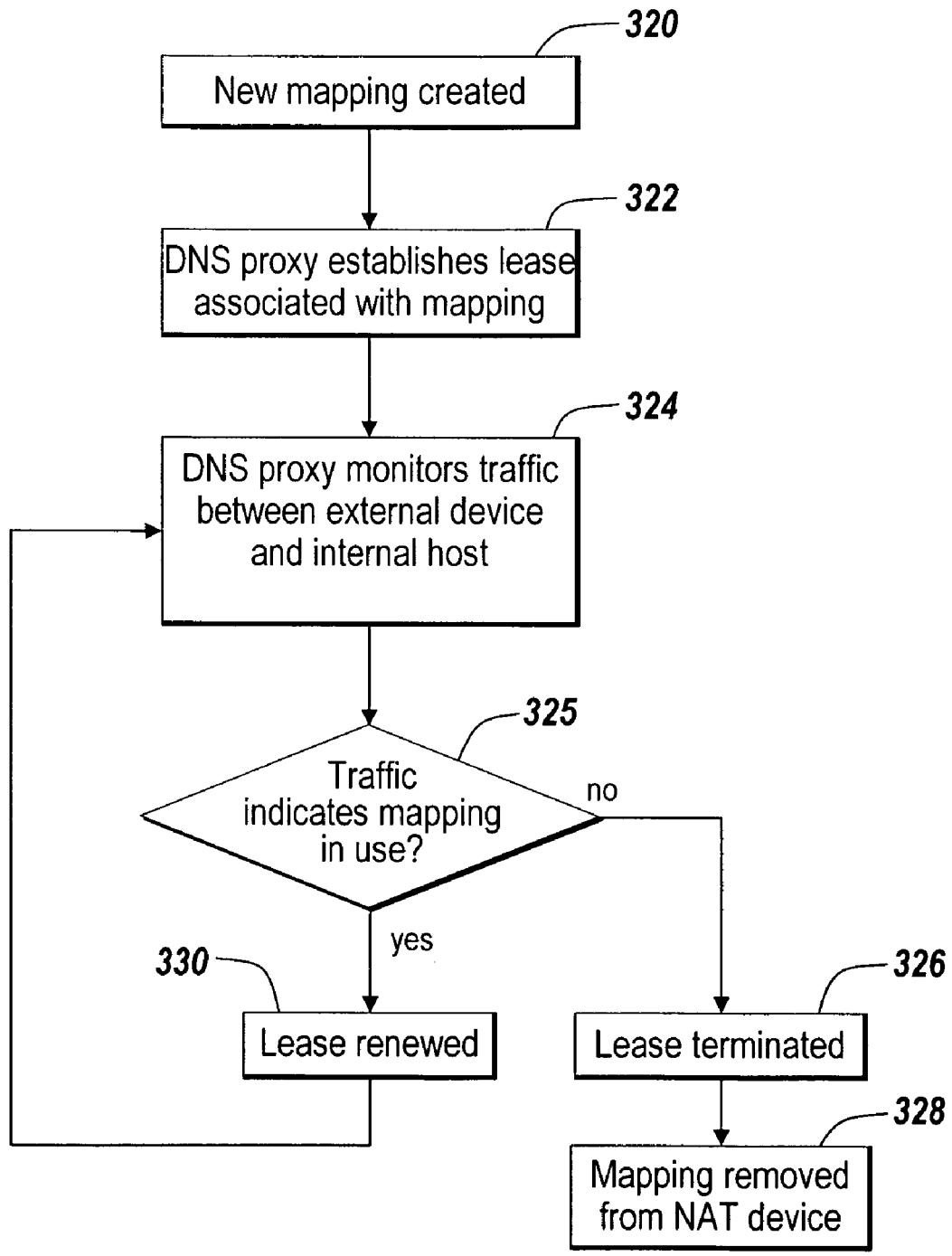
FIG. 5 is a flowchart of the sequence of steps followed by the illustrative embodiment of the present invention to create a lease for a newly generated mapping between an internal and external address.

The lifecycle of the new mapping created by the dynamic NAT of the present invention may be controlled by a lease. In one implementation, the lease may be dynamically created by having the DNS proxy request an available external address from a DHCP server. The process by which the illustrative embodiment of the present invention utilizes a lease is illustrated in the flowchart of FIG. 5. The sequence begins with the creation of a new mapping between an internal system and an external address (step 320). The DNS proxy 100 may be used to create a periodically renewable lease that is associated with the new mapping (step 322). The lease indicates whether or not the mapping is currently available. The DNS proxy 100 monitors the amount of packets being transmitted over the connection between the external device and the internal host (step 324). If the lease requires continual communication, and the DNS proxy 100 detects that the number of packets being transmitted exceeds a defined parameter within a set time period (indicating that the mapping is still in use) (step 325), the DNS proxy 100 informs the DHCP server and the lease is renewed. The DNS proxy 100 continues to monitor the connection between the external network 72 and the internal system and when the number of packets fails to exceed a parameter (indicating the mapping is no longer in use) (step 325) the lease is terminated (step 326) and the mapping removed from the NAT device by the DNS proxy (step 328). Those skilled in the art will recognize that other mechanisms for creating and utilizing leases assigned to dynamic NAT mappings may also be utilized without departing from the scope of the present invention. For example, the lease may require some activity in a certain time period rather than continual communication. Alternatively, the lease may not be generated by a separated DHCP server 120. Furthermore, as previously noted in the discussions of FIGS. 2 and 3, the actions being performed in FIG. 5 may be conducted by a different combination of components than those discussed in FIG. 5.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, PERL, or the JAVA programming language. The software programs may be stored on or in one or more mediums as object code. Hardware acceleration may be used and all or a portion of the code may run on a FPGA or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method of dynamically performing Network Address Translation (NAT) comprising:

receiving a Domain Name Service (DNS) lookup request for an internal host inside a firewall from an external device located outside the firewall;

creating, in response to the received DNS lookup request, a new mapping of an internal address from a device inside the firewall to an external network address;

modifying a hostname to include an identifier for a communication protocol as part of the received DNS lookup request; and configuring a specific port for the new mapping based on the identifier for the communication protocol in the received DNS lookup request reconfiguring dynamically a NAT device to reflect the new mapping.

2. The method of claim 1, further comprising:

assigning a lease to the new mapping, the lease indicating the length of time for which the new mapping is valid.

3. The method of claim 2 wherein a DHCP server is used to create the lease.

4. The method of claim 2, further comprising:

renewing the lease based on a minimum number of packets being transmitted between the external device and the internal address within a defined time period.

5. The method of claim 1 wherein a single external address is mapped to a single internal address.

6. The method of claim 1 wherein a plurality of external addresses are individually and uniquely mapped to a plurality of internal addresses.

7. The method of claim 1, further comprising:

routing a communication from said external device to the internal address using the new mapping in the NAT device.

8. A system for dynamically performing Network Address Translation (NAT) comprising:

a Network Address Translation (NAT) device providing NAT for a network, the network having at least one external network address;

at least one internal host located inside a firewall for the network;

a dynamic Domain Name Service (DNS) server for creating a new mapping of an internal host address to an external host for the network;

a DNS proxy that identifies DNS lookup requests for the at least internal host inside the firewall that are received from an external device located outside the firewall, the DNS proxy reconfiguring dynamically the NAT device to reflect a new mapping between an address for the internal host and an external address for the network;

wherein, the NAT is reconfigured to modify a host address to include an identifier for a communication protocol included in the DNS lookup request; and the NAT reconfiguration includes configuring a specific port for the new mapping based on the identifier for the communication protocol in the DNS lookup request.

9. The system of claim 8 wherein a communication is routed from said external device to the internal address using the new mapping in the NAT device.

10. The system of claim 8, further comprising:

a Domain Host Configuration Protocol (DHCP) server that creates a lease assigned to the new mapping.

11. The system of claim 10 wherein the length of the lease depends upon continued traffic occurring between the external device and the internal host.

12. A non-transitory medium holding computer-executable instructions for dynamically performing Network Address Translation (NAT), the instructions comprising:

instructions for receiving a Domain Name Service (DNS) lookup request for an internal host inside a firewall from an external device located outside the firewall;

instructions for creating, in response to the received DNS lookup request, a new mapping of an internal address from a device inside the firewall to an external network address;

instructions for modifying a hostname to include an identifier for a communication protocol as part of the received DNS lookup request;

instructions for configuring a specific port for the new mapping based on the identifier for the communication protocol in the received DNS lookup request;

instructions for reconfiguring dynamically a NAT device to reflect the new mapping; and instructions for routing a communication from said external device to the internal address using the new mapping in the NAT device.

13. The medium of claim 12 wherein the instructions further comprise: instructions for assigning a lease to the new mapping, the lease indicating the length of time for which the new mapping is valid.

14. The method of claim 13 wherein a DHCP server is used to create the lease.

15. The medium of claim 13 wherein the instructions further comprise:

instructions for renewing the lease based on a minimum number of packets being transmitted between the external device and the internal address within a defined time period.

16. The medium of claim 12 wherein the instructions further comprise:

instructions for routing a communication from said external device to the internal address using the new mapping in the NAT device.

\* \* \* \* \*